United States Patent

Ahrens

[15] 3,697,641
[45] Oct. 10, 1972

[54] NONHYGROSCOPIC NON-SUGARBASE NONCARIOGENIC-VITAMIN C RELEASABLE BASE MATERIAL FOR USE IN THE PREPARATION OF SUCKABLE TABLETS, LOZENGES AND CHOCOLATE

[72] Inventor: Gerhard W. Ahrens, 1781 East 15th Street, Brooklyn, N.Y. 11229

[22] Filed: Jan. 2, 1970

[21] Appl. No.: 468

[52] U.S. Cl. ..........................424/38, 99/11, 99/23, 99/118, 99/122, 99/123, 99/134, 99/138, 424/280
[51] Int. Cl. ..........................A61j 3/06, A61k 15/12
[58] Field of Search ......424/38, 280; 99/11, 23, 118, 99/122, 123, 134, 138

[56] References Cited

UNITED STATES PATENTS

| | | | |
|---|---|---|---|
| 2,260,870 | 10/1941 | Ruskin | 424/280 X |
| 2,427,692 | 9/1947 | Ruskin | 424/280 X |
| 3,525,791 | 8/1970 | Ahrens | 424/280 |

OTHER PUBLICATIONS

Chem. Abstracts 53:22513f (1959).
Chem. Abstracts 61:7600d (1964).

*Primary Examiner*—Shep K. Rose

[57] ABSTRACT

This invention relates to novel nonhygroscopic non-sugarbase and noncariogenic Vitamin C releasable base materials of suitable structural soundness for use in the preparation of and incorporation in suckable tablets, lozenges and chocolate, alone or in conjunction with suitable other desired additions such as flavoring-, medical-, antimicrobial-, sweetening-, coloring agents and the like, and including agents generally employed in the art of tablet, lozenge, and chocolate making, and vitamins, and specifically relates to compositions of the novel base material that may be formed by compounding suitably selected solid glycerides of the self-emulsifying type with calcium ascorbate dihydrate as a noncariogenic-Vitamin C or 1-ascorbic acid releasable constituent therein, alone or in admixture with dibasic magnesium phosphate capable of conferring upon products prepared with said base material, including tablets, lozenges, and chocolate, anti-cariogenic properties as well.

The invention relates also to the use of those selected solid glycerides of the self-emulsifying type as being useful for compounding with calcium ascorbate dihydrate, alone or in conjunction with dibasic magnesium phosphate and other desired ingredients, which are derived from at least one of the group including edible fats; oils; and edible fat-forming fatty acids and the preferred forms of the glycerides selected for forming the base material of the invention as a constituent therein are glycerol stearate; glycerol palmitate and mixtures of glycerol stearates with glycerol palmitates which contain in their respective compositions each at least about thirty parts by weight percent mono-ester groups.

10 Claims, No Drawings

3,697,641

NONHYGROSCOPIC NON-SUGARBASE NONCARIOGENIC-VITAMIN C RELEASABLE BASE MATERIAL FOR USE IN THE PREPARATION OF SUCKABLE TABLETS, LOZENGES AND CHOCOLATE

This invention relates to a novel nonhygroscopic non-sugarbase noncariogenic-Vitamin C of l-ascorbic acid releasable base material for use in the preparation of an incorporation in suckable tablets, lozenges and chocolate products, alone or in conjunction with suitable other desired additions including flavoring-, medical-, antimicrobial-, sweetening-, coloring agents and the like and including ingredients generally employed in the art of tablet-, lozenge-, and chocolate making, and vitamins, and specifically relates to compositions of the novel base material formed by compounding calcium ascorbate dihydrate alone or in admixture with dibasic magnesium phosphate with solid glycerides of the selfemulsifying type derived from at least one of the group including edible fats; oils; and edible fat-forming fatty acids.

This invention relates also to such novel base materials of the invention in which the preferred form of solid glycerides of the self-emulsifying type refers to the use of glycerol esters derived from at least one of the group including edible fats; oils; and edible fat-forming fatty acids and preferably glycerol stearates, glycerol palmitates and mixtures of glycerol stearates with glycerol palmitates of the same containing in their respective compositions each at least about 30 parts by weight percent mono-ester groups Products prepared through the use of the base material of the invention are of a class which are slowly dispersible respectively solvable in mouth fluids by sucking actions to cause thereby the release of their contents, including Vitamin C or l-ascorbic acid in its noncariogenic form of its calcium salt "calcium ascorbate dihydrate" and other ingredients that may have been incorporated therein, as well as of dibasic magnesium phosphate where same is a constituent of the base material in which it is exerting not only anticariogenic effects but also serving as mineral balancing agent for the calcium being liberated from the calcium ascorbate dihydrate constituent in such products during their solvation in mouth fluids as result of the subsequent decomposition of said calcium ascorbate dihydrate taking place upon entering said mouth fluids through the action of enzymic catalysts normally present in the said mouth fluids.

Products prepared by the use of the new base material of the invention include, among others, mouth refreshing and flavoring, medical and vitamin tablets and lozenges and novel chocolates capable of releasing upon being sucked in the mouth noncariogenic Vitamin C or l-ascorbic acid, anticariogenic effects and effects from other added ingredients as well. Where novel chocolates are concerned into which the new base material of the invention is incorporated, their normally considerable cariogenic property is by the presence therein of dibasic magnesium phosphate considerable reduced if not entirely offset, depending on the amount of dibasic magnesium phosphate incorporated therein. The presence of dibasic magnesium phosphate in conjunction with calcium ascorbate in any of the products prepared by the use of the base material of the invention helps, as already pointed out, to physiologically balance the intake by a person of calcium being released through the decomposition of the calcium ascorbate constituent in such a product during its solvation in mouth fluids as result of sucking actions and thereby prevents undesirable physiological mineral imbalances to develop in a person consuming more than one piece of the novel Vitamin C-chocolate or other product of the invention prepared by the use of the base material of the invention containing both calcium ascorbate and magnesium phosphate.

In contrast to known tablets and lozenges containing l-ascorbic acid or Vitamin C in the free acidic form in which same possesses considerable cariogenicity, tablets, lozenges, and chocolates prepared to contain calcium ascorbate dihydrate instead as the source for releasable Vitamin C or l-ascorbic acid do not exert cariogenicity as this is obviously prevented by the presence therein of the calcium ion and, where the calcium ascorbate is used in the co-presence of dibasic magnesium phosphate, the calcium ascorbate also fails to introduce undesirable metal ions into the physiology of human beings such as would be introduced if instead, for instance, a sodium salt of l-ascorbic acid of Vitamin C had been employed with its harm to, for instance, heart patients.

The employment of a nonhygroscopic base material instead of a hygroscopic one represents, in addition, the obvious advantage of assuring greater stability and longer shelflife for products prepared therewith, particularly where some of the other ingredients incorporated therein are, for instance, medical agents or vitamins and the like having only limited stabilities, so that the use of the new base material of the invention, which is nonhygroscopic, also in this respect constitutes a sound advance in the art of medical and vitamin tablet and lozenge making and is in sharp contrast to heretofore employed base materials such as sugarbase materials and non-sugarbase materials including gums, pectins, carbohydrates such as starches, water-soluble cellulose esters such as methyl cellulose, proteins and the like, all of which lacking nonhygroscopicity, except for also proposed solid polyethylene glycols which, however, do constitute a serious health hazard to humans (see: Merck's Index, 7th Edition, 1960, pages 213 and 429) and should not be used therefore. Where sugarbased base materials are used, there exists an obvious health hazard to diabetics in addition to their extreme cariogenic or caries-forming hazards as so amply expressed in a published authoritative data citing sugarbased lozenges as "prime factors in the development of rampant caries formation" and thereby showing that there existed an urgent need for a new non-sugarbase material for use in the preparation of tablets and lozenges, particularly such which contained, for instance medical agents and vitamins, and which should also be a nonhygroscopic one but freely able to release its constituent active ingredients into the mouth fluids as result of sucking actions.

The present invention has filled this urgent need by providing not only a non-sugarbase base material but also a nonhygroscopic base material which is able to freely release incorporated constituents therein into the mouth fluids as result of sucking actions and which, in addition, possesses the unexpected novel property of also releasing, incidental to the release of other incorporated ingredients therein, vitamin "1-ascorbic acid" or Vitamin C in a noncariogenic form as its calcium salt, as well as anticariogenic effects derived from dibasic magnesium phosphate which may have been additionally incorporated therein, and thereby enables the preparation of entirely new products such as mouth refreshing and flavoring, medical and vitamin tablets, lozenges, and even chocolate upon which the properties of the base material are conferred to thereby release upon being sucked in the mouth not only ingredients and effects of same being incorporated therein, but also Vitamin C or 1-ascorbic acid in the noncariogenic form and anticariogenic effects from the presence in such products of dibasic magnesium phosphate.

In carrying out the invention, I make use of the nonhygroscopic calcium ascorbate dihydrate, of the formula ( $C_6H_7O_6$ )$_2$Ca·2H$_2$O , such as described in U.S. Pat. Nos. 2,596,103 and 2,631,155, both by Ruskin, and I compound the same with a solid glyceride of the self-emulsifying type derived from at least one of the group of edible fats; oils; and edible fat-forming fatty acids, or I make use of the said calcium ascorbate dihydrate in admixture with dibasic magnesium phosphate of the formula MgHPO$_4$·3H$_2$O having almost zero water solubility and compound this mixture with the selected solid glyceride defined above which is preferably one containing in its composition at least about thirty parts by weight percent mono-ester groups as selected preferably from the group including glycerol esters thereof such as, for instance, glycerol stearates; glycerol palmitates; and mixtures of glycerol stearates with glycerol palmitates and with or without the addition of other desired suitable ingredients of the end-product to be formed by the use of the base material of this invention which may include flavoring-, medical-, antimicrobial-, sweetening-, coloring agents and the like and including agents generally employed in the art of tablet, lozenge, and chocolate making, and vitamins and thereby produce directly either the desired end-products in form of tablets and lozenges being then formed and shaped in appropriately known equipment, or indirectly base materials to be introduced and incorporated in such end-products, particularly with regard to chocolate.

It is by the nature of the raw materials employed in the preparation of the new base material of the invention that therein to be incorporated other desired ingredients to be released upon sucking actions in mouth fluids must be either water-soluble, dispersible, or emulsifiable to be called suitable as the effect of the selfemulsifying type glyceride therein comes into fore. It, too, is by the nature of the raw materials employed in the preparation of the new base materials of the invention that therein incorporated dibasic magnesium phosphate which is almost insoluble is solubilized therein in contact with mouth fluids as result of the co-presence therewith of a water-soluble organic oxy-acid salt, namely calcium ascorbate dihydrate, to cause thereby the release of its anticariogenic potencies as well as of its mineral balancing effects with respect to calcium being liberated from the calcium ascorbate dihydrate during solvation in the said mouth fluids as result of its subsequent decomposition caused by the action of enzymic catalysts normally present in mouth fluids (See: Newberg et al.-Zeitschrift fuer Vitamin-, Hormon-Fermentforschung, Volume 2,1949, pages 480 to 492, particularly page 486, describing the effect of water-soluble organic oxy-acid salts upon water-insoluble phosphate salts, including magnesium phosphate of the dibasic type, and demonstrating that in the presence of water such organic oxyacid salts exerted a co-solvation effect and co-dispersion effect upon dibasic magnesium phosphate capable of bringing it into solution) and that the co-presence of the said self-emulsifiable solid glyceride therein provides for a generally smooth solvation thus of all of the ingredients of products prepared by the use of the new base material of the invention in mouth fluids upon sucking actions whereas constituting outside mouth fluids a nonhygroscopic non-sugarbase noncariogenic-Vitamin C or 1-ascorbic acid releasable and respectively anticariogenically effective solid material of suitable structural soundness and stability having a well-defined softening point of about 60° C which thus allows its easy introduction for instance in hot chocolate masses and the like, and furthermore allows any forming and shaping and pressing operations whatever necessary to obtain the desired end-products containing the base material of the invention to make use of its desired properties and, to my knowledge, it is the first time that calcium ascorbate dihydrate which is a hardcrystalline nonhygroscopic oxy-acid metal salt has ever been compounded with likewise nonhygroscopic solid glycerides of a type defined above for the formation of non-sugarbase base materials useful in the preparation of tablets, lozenges and even chocolates and it is also the first time, to my knowledge, that a combination of calcium ascorbate with dibasic magnesium phosphate has been compounded with such a same type glyceride in the formation of non-sugarbase base materials for their combination noncariogenic Vitamin C or 1-ascorbic acid and anticariogenic and mineral balancing effects being conferred upon the products prepared therewith.

In further carrying out the invention, I compound sufficient amounts of afore-referred-to ingredients by first heating the same in separate vessels and then combining the same under agitation and kneading action and further mechanical treatment including homogenization until a satisfactory product is obtained lending itself to be cast into forms or molds, or formed into desired shapes whatever or upon reheating for introduction in product masses such as chocolate. Prospective desired end-products containing the base materials of the invention may thereby be produced in a one-step process by way of adding the desired suitable ingredients intended to be constituents in such end-products simultaneously or shortly after the basic main ingredients calcium ascorbate, dibasic magnesium phosphate and solid glycerides are being or have been compounded, which results in end-products of excellent homogeneity. Where the end-product however is to be a chocolate, the preferred form of introducing the base material of the invention is reheating the finished base material after its original formation and introducing the same directly into the hot mass of liquid or pasty chocolate under agitation and kneading actions followed by standard mechanical treatments of the chocolate mass to the finished bars, whereby it is noted that the base material of the invention combines with the chocolate mass extremely easily and in a manner never before thought possible because of the fact that calcium ascorbate dihydrate itself does not lend itself to such introduction in chocolate masses. Before combining the preheated basic ingredients for the purpose of forming the base material of the invention, however, I have found that the glyceride should first be heated to a temperature between 100°–105° C until it is clear and that the calcium ascorbate alone or in combination with dibasic magnesium phosphate should be preheated to about 80° C and then combined with or without further additions of other ingredients desired to be incorporated therein including for instance flavoring agents such as peppermint oil, cherry flavor-, lemon flavor-, vanilla flavor-, rasberry flavor-, menthol flavor extracts and the like; medical agents such as antiinflammatory agents; pain releaving agents; antimicrobial agents such as phenols; aromatic alcohols; essential oils; quarternary ammonium compounds and the like; vitamins such as Vitamin E or Vitamin A and ingredients generally employed in the art of tablet, lozenge, and chocolate making. The product is either the finished end-product or one which can be added for incorporation into desired products to confer upon same properties possessed by the base material of the invention under consideration. However, it should be pointed out, too, that the application of high local concentrations of l-ascorbic acid exerts itself antimicrobial effects and that its possible combination with phenol reduces the toxicity of the latter without impairing its antimicrobial potency as the result of a kind of synergism between l-ascorbic acid and phenols ( Leibowitz et al. Biochemical Journal, Volume 55,1953, pages 388 to 392; Leibowitz et al. Zeitschrift fuer Vitamin forschung, Volume 8, 1938, pages 8 to 24 Leibowitz et al. Harefuah Medical Journal, Volume 14,1958, pages 224) so as to make it particularly desirable to use the new base material of the invention as a base for medical products expected to exert also antimicrobial properties without increased toxicity to human mucous membranes of mouth, throat, and nose.

In thus compounding the selected basic ingredients to form the base material, as well as products thereof, the preferred amounts of each of the ingredients needed to form suitable base materials being for the calcium ascorbate dihyrate from 47 to 56 approximately when used alone and not in admixture with the dibasic magnesium phosphate, and for the glyceride from approximately 40 to 44 parts by weight percent, however, where calcium ascorbate dihydrate is used in conjunction with admixed dibasic magnesium phosphate, the preferred amounts of each of the basic ingredients needed to form suitable base materials are for the calcium ascorbate dihydrate from 40 to 55 approximately, for the dibasic magnesium phosphate from 2 to 22 approximately, and for the glyceride from approximately 34 to 45 parts by weight percent, whereas the amounts of other added suitable ingredients may range from about 1.5 to 13 parts by weight percent approximately as far as the base material itself is concerned including mouth-refreshing and flavoring, medical, and vitamin tablets and lozenges, and from about 85 to 99.5 parts by weight percent approximately as far as for instance chocolate mass is concerned into which the base material is being introduced to confer upon same its properties.

As far as processing is concerned, the heating of calcium ascorbate dihydrate to the temperature indicated caused no degradation whatever although the period of preheating to about 80° C extended generally for about 20 minutes, preferably in a temperature controlled electric oven until this temperature was reached. Too, the subsequent short exposure to hot glyceride at around 100° to 105° C had no detrimental effect although air was not excluded during such processing. Obviously also the hot fatty material provided thereby some sort of protective atmosphere for the calcium ascorbate material. This great heat resistance of calcium ascorbate dihydrate came as a surprise because it was the first time that such heating was carried out in the presence of air without damage to the heated material. Whereas Ruskin and Merrel (Science, 1947, Volume 105, pages 504–5) had shown that the exposure of calcium ascorbate for 6 hours to boiling toluene which boils at 240.8°F. or 115.5°C caused only a slight degradation in the same, this test, performed in a thus protective atmosphere, could not be used as a guide to determine whether calcium ascorbate dihydrate would successfully resist heating in the presence of air for periods of time sufficient to evaluate its usefulness for use in the present invention. To test this point, a series of tests was carried out, in cooperation with the Charles Pfizer & Co. Incorporated who was the manufacturer of the calcium ascorbate dihydrate used therein, by heating specimens of calcium ascorbate dihydrate in a temperature-controlled electric oven through which air was passed during the tests for 17 minutes to 250° F., followed by a check on the retained Vitamin C potency of the specimens. The test specimens used were (1) standard calcium ascorbate dihydrate; (2) the same calcium ascorbate dihydrate coated with 1 percent methyl cellulose. The results reported by Charles Pfizer & Co. Incorporated declared that the heating in the electric oven for 17 minutes at 250° F. in the presence of passing air currents caused no structural detriment nor reduced it the Vitamin C potency of either specimens which remained for all practical purposes unchanged. The actual figures showed 100 percent retainment of Vitamin C potency in the coated specimens and 99.63 percent retainment of Vitamin C potency in the uncoated specimens which difference was ascribed to be within a possible experimental error. There was no color change in the uncoated specimens, whereas the coated specimens became darker, possibly as result of the heat upon the coating which discolored. The choice was thus obviously to use for the purposes of preparing the base material of the invention the uncoated calcium ascorbate dihydrate and this proved to be successful as during the heating at no time the heat was too high nor for too long a period of time to cause a change of state in the calcium ascorbate dihydrate employed from its dihydrate to the monohydrate and even nonhydrous state through loss of water of hydration and subsequent formation of an unstable product (see U.S. Pat. No. 2,596,103) not useful in the formation of the base material of the invention. It is thus this particular nonhygroscopic state of the employed calcium ascorbate dihydrate which makes possible to prepare the desired suitable base materials of the invention, and it is essential that during any processing whatever of the base material during its formation or subsequent use in preparing other products or be incorporated therein precautions must be taken to avoid such a change of state.

By way of example, Table I illustrates some preferred compositions of base materials of the invention employing in their formation calcium ascorbate dihydrate alone together with the solid glyceride constituents therein and with or without other ingredients:

TABLE I

In parts by wt. percent:      Base Material Number

| Ingredients: | A | B | C | D | E | F | G |
|---|---|---|---|---|---|---|---|
| Glycerides: | 40.00 | 41.00 | 41.00 | 42.00 | 43.50 | 43.50 | 44.00 |
| Calcium Ascorbate dihydrate: | 47.00 | 56.00 | 55.00 | 55.00 | 55.00 | 48.00 | 56.00 |
| Other ingredients: | 13.00 | 3.00 | 4.00 | 3.00 | 1.50 | 8.00 | --.-- |
| Vitamin C activity/per gram in milligrams available: | 385 | 459 | 451 | 451 | 451 | 393 | 459 |

Other ingredients include either desired suitable ones for the particular purpose each base material may be employed and may include ingredients with which to prepare simultaneously the base material and the product containing the base material. However, non of the examples given shall be limited thereto.

By way of example, in addition, Table II illustrates some preferred compositions of base materials of the invention employing in their formation calcium ascorbate dihydrate in admixture with dibasic magnesium phosphate together with the selected glyceride constituents therein and with or without other ingredients: Other ingredients include either desired suitable ones for the particular purpose each base material may be employed or may include ingredients with which to prepare simultaneously the base material and the product containing the base material. None of the examples given, however, shall be limited thereto.

By way of example, Table III refers to applications of some of the base materials shown in Tables I and II being introduced into chocolate masses after reheating the same above the softening point and working into the chocolate mass while still hot, whereby it shall be understood that other than chocolate masses may be the mass into which thereby the selected base material of the invention may be introduced in this manner, followed by subsequent working of the combined mass and either casting or shaping and forming by appropriate means known in the art of candy and chocolate, tablet and lozenge making. Preferably using in chocolates base materials containing dibasic magnesium phosphate in their compositions on account of their anticariogenic effect necessary to at least partial suppress or even fully suppress cariogenic properties resulting from the chocolate mass containing ingredients that may be cariogenic such as sugar, the chocolates containing these base materials of the invention release not only noncariogenic Vitamin C or l-ascorbic acid as its calcium salt but possess simultaneously also anticariogenic properties to make them very much preferable to standard chocolates, thereby not only serving as a conventional sweet but also as able replacement for standard vitamin C tablets, with a pleasant taste to go with it. The examples given in the table, however, shall not be limited thereto.

TABLE III

| In parts by weight percent Ingredients: | Vitamin C Chocolates | | | |
|---|---|---|---|---|
| | No. 1 | No. 2 | No. 3 | No. 4 |
| Number of base material used: | | | | |
| Base material M (table II): | 1,546 | -.--- | -.--- | -.--- |
| Base material I (table II): | -.--- | 10.800 | -.--- | -.--- |
| Base material J (table II): | -.--- | -.--- | 15.000 | -.--- |
| Base material S (table II): | -.--- | -.--- | -.--- | 20.000 |
| Constituents in the base material: | | | | |
| Glyceride (from base material) | 0.603 | 3.860 | 5.400 | 6.800 |
| Calcium ascorbate dihydrate | 0.773 | 5.500 | 6.600 | 8.500 |
| Dibasic magnesium phosphate | 0.139 | 1.440 | 3.000 | 4.400 |
| Other ingredients | 0.031 | -.--- | -.--- | 0.300 |
| Amount of chocolate mass into which base material introduced: | 98.454 | 89.200 | 85.000 | 80.000 |
| Total: | 100.000 | 100.000 | 100.000 | 100.000 |
| Vitamin C activity/per gram in milligrams: | 6.34 | 45.15 | 54.12 | 69.70 |
| Vitamin C activity/per ounce of chocolate: | 222.63 | 1592.61 | 1909.02 | 2453.00 |

TABLE II

| Ingredients (in parts by weight percent: | Base material number | | | | | | | | | | | | |
|---|---|---|---|---|---|---|---|---|---|---|---|---|---|
| | H | I | J | K | L | M | N | O | P | Q | R | S | T |
| Glycerides | 35.0 | 35.7 | 36.0 | 36.0 | 36.0 | 39.0 | 40.0 | 45.0 | 38.0 | 38.0 | 34.0 | 34.0 | 34.0 |
| Calcium ascorbate | 49.0 | 51.0 | 44.0 | 41.0 | 44.0 | 50.0 | 55.0 | 53.0 | 40.0 | 50.0 | 48.0 | 42.5 | 50.0 |
| Dibasic magnesium-phosphate | 14.0 | 13.3 | 20.0 | 20.0 | 18.0 | 9.0 | 5.0 | 2.0 | 14.0 | 10.0 | 15.0 | 22.0 | 14.0 |
| Other ingredients | 2.0 | | | 3.0 | 2.0 | 2.0 | | | 8.0 | 2.0 | 13.0 | 1.5 | 2.0 |
| Vitamin C activity/per gram in milligrams available | 401 | 418 | 360 | 336 | 360 | 410 | 451 | 434 | 369 | 410 | 393 | 348 | 410 |

Excellent Vitamin C chocolates may be obtained even when less than 0.5 parts by weight percent of suitable base material is used or when more than 20 parts by weight percent are used. The preferred chocolate material is standard dark base chocolate without being limited thereto.

By way of example, some preferred compositions of novel mouth-refreshing and flavoring tablets or lozenges employing some of the base materials listed in Table II are presented in Table IV, without being limited thereto:

TABLE IV

In parts by weight percent:      Vitamin C Mouthrefreshing Lozenges
Ingredients:      No.5 No.6 No.7 No.8 No.9 No.10
No. of employed base from Table II:

| Base material | | | | | | |
|---|---|---|---|---|---|---|
| No. I: | 98.00 | -.-- | -.-- | -.-- | 98.00 | 96.00 |
| Base material No. J: | -.-- | 98.00 | -.-- | -.-- | -.-- | -.-- |
| Base material No. N: | -.-- | -.-- | 98.00 | -.-- | -.-- | -.-- |
| Base material No. O: | -.-- | -.-- | -.-- | 98.00 | -.-- | -.-- |
| Other ingredients: | 0.10 | 0.10 | 0.10 | 0.10 | 0.10 | 0.10 |
| Menthol: | 0.33 | 0.50 | 0.43 | -.-- | -.-- | 1.00 |
| Peppermint oil: | 1.40 | -.-- | -.-- | 0.10 | 0.10 | 2.00 |
| Edible coloring matter: | 0.02 | 0.02 | 0.02 | 0.02 | 0.02 | -.-- |
| Saccharin: | 0.10 | 0.10 | 0.10 | 0.05 | 0.05 | 0.02 |
| Rasberry Flavoring: | -.-- | 1.28 | -.-- | -.-- | -.-- | -.-- |
| Cherry Flavoring: | -.-- | -.-- | -.-- | -.-- | 1.73 | -.-- |
| Vanillin: | 0.05 | -.-- | 1.35 | -.-- | -.-- | 0.88 |
| Lemon Flavoring: | -.-- | -.-- | -.-- | 1.73 | -.-- | -.-- |
| Vitamin C activity/ per gram/in milligrams: | 411 | 352 | 441 | 425 | 411 | 401 |

Other ingredients than those referred to in the Table IV may be contained in the novel Vitamin C mouth-refreshing lozenges. These may be included among those cited under the term "other ingredients." Other flavors may be used than those referred to, including chocolate flavors and the like. Of particular value for mouth-refreshing lozenges and tablets is the fact that same is dissolved in the mouth extremely slowly. For instance it may take about an hour to dissolve a 1-gram weighing lozenge cited under No. 10, thereby slowly supplying Vitamin C in the noncariogenic calcium salt form as well as anticariogenic effects from its magnesium phosphate content and antiseptic effects from its peppermint oil contents which is possessing considerable antimicrobial properties. The long-lasting supplication of Vitamin C at high local concentration, too, exerts a known antimicrobial effect and soothing effects for the throat as well, this being based on the fact that calcium ascorbate exerts a known beneficial effect against inflammatory conditions and has been used itself successfully in the treatment of various affections of the mouth, throat, and nasal membranes including microbial infections, sinus infections, pyogenic inflammations of nose and throat and nasal accessory sinuses, gum inflammation including pyorrhea alveolaris and others.

By way of example, in addition, Table V presents some preferable compositions of novel suckable medical tablets or lozenges prepared by the use of some of the new base materials listed in Tables I and II, but not limited thereto:

TABLE V

In parts by weight percent:

| Ingredients: | Medical Vitamin C Lozenges | | | | | |
|---|---|---|---|---|---|---|
| | no.11 | no.12 | no.13 | no.14 | no.15 | no.16 |
| Employed base material "B": | 97.00 | -.-- | -.-- | -.-- | -.-- | -.-- |
| Employed base material "C": | -.-- | 96.00 | -.-- | -.-- | -.-- | -.-- |
| Employed base material "D": | -.-- | -.-- | 97.00 | -.-- | -.-- | -.-- |
| Employed base material "N": | -.-- | -.-- | -.-- | 98.00 | -.-- | -.-- |
| Employed base material "M": | -.-- | -.-- | -.-- | -.-- | 97.00 | -.-- |
| Employed base material "I": | -.-- | -.-- | -.-- | -.-- | -.-- | 97.00 |
| Pain-killing agents: | 0.15 | 0.15 | 0.10 | 0.15 | 0.20 | 0.10 |
| Other ingredients: | 1.00 | 1.35 | 0.90 | 0.35 | 1.80 | 1.40 |
| Antimicrobial agents: | 1.85 | 2.50 | 2.00 | 1.50 | 1.00 | 1.50 |
| Vitamin C activity/ per gram in milligrams: | 459 | 451 | 451 | 451 | 410 | 418 |

The term "pain-killing agents" shall include agents such as aspirin, benzocaine and the like; the term "other ingredients" shall include agents such as used in flavoring, sweetening, coloring, eventual drugs, and the like; the term antimicrobial agents shall include agents such as phenols including hexylresorcinol, aldehydes such as the stereoisomeric citronellal, alcohols such as the stereoisomeric citronellol and the like, aromatic phenylic alcohols such as phenyl-propyl-alcohol or phenyl-ethyl-alcohol, benzyl-alcohol and the like, essential oils such as peppermint oil, oil of clove and substances derived from essential oils such as eucalyptol, eugenol, thymol, and the like, vanillin, and the like and quarternary ammonium compounds, including cetyl pyridium chloride, cetyl trimethylammonium bromide and the like, alone or in conjunction with either.

By further way of example, Table VI presents some preferable compositions of vitamin tablets or lozenges employing some of the base materials enumerated in Table II but not limited thereto nor limited to the compositions presented:

TABLE VI

In parts by weight percent:

| Ingredients: | Vitamin Lozenges | | | | |
|---|---|---|---|---|---|
| | no.17 | no.18 | no.19 | no.20 | no.21 |
| Employed base material "Q": | 98.00 | 98.00 | 98.00 | 97.00 | -.-- |
| Employed base material "R": | -.-- | -.-- | -.-- | -.-- | 92.00 |
| Flavoring material: | 0.63 | 0.63 | 0.38 | 1.38 | 2.88 |
| Other ingredients: | 0.12 | 0.12 | 0.12 | 0.12 | 0.12 |
| Vitamin E-d-alpha-tocopherol "A": | 1.25 | -.-- | -.-- | -.-- | 5.00 |
| Vitamin E-d-alpha-tocopherol "B" | -.-- | 1.25 | -.-- | -.-- | -.-- |
| Vitamin E-d-alpha-tocopherol "C": | -.-- | -.-- | -.-- | 1.50 | -.-- |
| Vitamin A - Vitamin A-palmitate: | -.-- | -.-- | 1.50 | -.-- | -.-- |
| Vitamin E activity/ gm I.U. | 15.12 | 18.62 | -.-- | 20.40 | 60.50 |
| Vitamin A activity/ gm I.U. | -.-- | -.-- | 3,750 | -.-- | -.-- |
| Vitamin C activity/ per gram/in mgs | 401 | 401 | 401 | 397 | 361 |

The term "Vitamin E -d-alpha-tocopheol A" refers to d-alpha-tocopheryl acid succinate, having a Vitamin E potency of 1,210 I.U./per gram; the term "Vitamin E-d-alpha-tocopherol B" refers to concentrated d-alpha tocopherol, having a Vitamin E potency of 1.49 I.U./gram; the term "Vitamin E -d-alpha-tocopherol C" refers to alpha-tocopherol acetate having a Vitamin E potency of 1.36 I.U. per gram and the term Vitamin A-Vitamin A-palmitate refers to a water-soluble commercial preparation as powder having a Vitamin A potency of 250,000 I.U. per gram, for instance "Palma-Sperse by Hoffman-La-Roche." Furthermore, the "other ingredients" shall include materials such as sweeteners, coloring agents, and the like.

In preparing vitamin lozenges using the base materials of the invention, it is essential that the vitaminic raw materials be added directly into the still hot mass of combined ingredients making up the base material chosen, as for instance the Vitamin E materials are not water-soluble but easily dispersed in the hot glyceride in the presence of calcium ascorbate under appropriate agitation, kneading, and working to the desired tablets or lozenges whatever, and henceforth also easily dispersible and or solvable in the mouth fluids under sucking actions.

The base materials to which this invention refers and the products prepared therewith shall be construed to be merely illustrative and not restrictive to the scope of this invention. Wherever the term tablet is used and wherever the term lozenge is used they are deemed to be for like products made with the base material of the invention and shall be considered products of the same kind.

What I claim is:

1. Suckable tablets, lozenges and chocolates, consisting of calcium ascorbate dihydrate compounded as a heat stable material with solid glycerides of self-emulsifying edible fats, oils, and fatty acids.

2. A material as defined in claim 1, in which the solid glyceride is a glycerol stearate containing in its composition at least about thirty parts by weight percent mono-ester groups, and the percentage weights of the solid glyceride therein being from 40 to 44 approximately, and of the calcium ascorbate dihydrate being from 47 to 56 approximately.

3. A material as defined in claim 1, in which the solid glyceride is a glycerol palmitate containing in its composition at least about 30 parts by weight percent mono-ester groups, and the percentage weights of the solid glyceride therein being from 40 to 44 approximately, and of the calcium ascorbate dihydrate being from 47 to 56 approximately.

4. A material as defined in claim 1, in which the solid glyceride is a mixture of glycerol stearate with glycerol palmitate containing in their respective compositions at least about 30 parts by weight percent mono-ester groups, and the percentage weights of the mixture therein being from 40 to 44 approximately, and of the calcium ascorbate dihydrate being from 47 to 56 approximately.

5. A material as defined in claim 1, further containing dibasic magnesium phosphate.

6. A material as defined in claim 5, in which the solid glyceride is selected from the group consisting of glycerol stearate; glycerol palmitate; and mixtures of glycerol stearates with glycerol palmitates containing in their respective compositions each at least about thirty parts by weight percent mono-ester groups, and the percentage weights of the selected solid glyceride therein being from 34 to 45 approximately, of the calcium ascorbate dihydrate being from 40 to 55 approximately, and of dibasic magnesium phosphate being from 2 to 22 approximately.

7. A material as defined in claim 5, homogeneously intermixed in chocolate stable against heat degradation of Vitamin C potency in the hot molten form of chocolate.

8. A material as defined in claim 7, wherein the percentage weights of the base material therein being from 0.5 to 20.0 approximately, and of the chocolate being from 99.5 to 80.0 approximately.

9. A material as defined in claim 1, homogeneously intermixed in chocolate stable against heat degradation of Vitamin C potency in the hot molten form of chocolate.

10. A material as defined in claim 9, wherein the percentage weights of the base material therein being from 0.5 to 20.0 approximately, and of the chocolate being from 99.5 to 80.0 approximately.

* * * * *